Patented Jan. 14, 1947

2,414,400

UNITED STATES PATENT OFFICE 2,414,400

UNSATURATED ESTERS AND POLYMERS THEREOF

Franklin Strain, Barberton, Ohio, assignor to Pittsburgh Plate Glass Company, Pittsburgh, Pa., a corporation of Pennsylvania No Drawing. Application March 31, 1944, Serial No. 528,954

10 Claims. (Cl. 260—78)

This application relates to a new class of polyunsaturated esters and their polymers having desirable properties as hereinafter described.

I have found that valuable unsaturated compounds may be prepared which have one unsaturated group derived by esterification of an unsaturated alcohol and another unsaturated group derived by esterification of an unsaturated dibasic acid.

The ester here claimed has the structure:

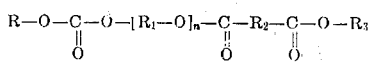

in which R is a radical of an unsaturated monohydric alcohol. $R_1$ is an alkylene group derived from a glycol, or polyglycol, $R_2$ is an unsaturated hydrocarbon group to which two carboxylic groups are attached, the group being derived from a dibasic acid, $R_3$ is an organic group having a relatively short molecular chain and $n$ is a small whole number.

R in the above formula is a radical derived from a monohydric alcohol having the hydroxy group attached to a carbon atom in a straight chain and having an unsaturated linkage between the second and third chain carbon atoms. Suitable alcohols are allyl, methallyl, chloroallyl, crotyl, chlorocrotyl, butadienyl, ethyl allyl, angelyl, tiglyl, and cinnamyl alcohols, linalool and methyl vinyl carbinol. Of these, the lower molecular alcohols containing shorter chains are preferred since the long chains appear to reduce the usefulness of the polymers.

$R_2$ is a hydrocarbon radical of an unsaturated dibasic acid to which the carbonyl groups are attached. The dibasic acid has unsaturation attached to a carbon atom adjacent to a carbonyl group in an aliphatic straight chain. Suitable dibasic acids are maleic, fumaric, itaconic, citraconic, mesaconic, fulgenic, zeronic, glutaconic, methylene malonic, pyrocinchoninic, muconic, acetylene dicarboxylic, α-methyl glutaconic, and α,β-dimethyl glutaconic acids.

$R_1$, in the above formula, is the alkylene group of a glycol or polyglycol. Suitable glycols are ethylene glycol, di-, tri-, and tetraethylene glycol, 1,2-propylene glycol, trimethylene glycol (1,3-propylene glycol), di-, tri-, and tetrapropylene glycols, tetramethylene glycols. Where $R_1$ is an alkylene group of a polyglycol $n$ will be greater than one (1).

$R_3$ is a low molecular hydrocarbon group such as the radical of methyl, ethyl, propyl, isopropyl, butyl, benzyl, etc. This is not a critical part of the molecule although high molecular weight alcohols will affect the properties of the polymers adversely.

The new compounds may readily be prepared by partially esterifying the unsaturated dibasic acid with saturated alcohol and then reacting the resultant product with thionyl chloride. The acid chloride so prepared may then be reacted with an excess of the glycol to form the compound:

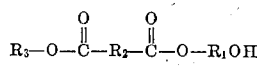

which can be reacted with a chloroformate of an unsaturated alcohol or consecutively with phosgene in neutral solution and with unsaturated alcohol to form the desired new ester.

These compounds may also be prepared from the halohydrins containing the desired $R_1$ group such as ethylene chlorohydrin, 2-chloropropyl alcohol, 1-chloro-2-hydroxy propane, 3-chloro-1,2-propylene glycol, 1,3-dichloroisopropyl alcohol, 3-iodo propyl alcohol, and iodoisopropyl alcohol. The halohydrin is reacted with a chloroformate of an unsaturated alcohol or consecutively with phosgene in a neutral solution and with the unsaturated alcohol to form compounds having the molecular structure:

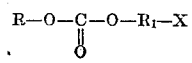

in which X is the halogen. These compounds are then reacted with silver or other metal salts of partial esters of unsaturated dibasic acids and saturated alcohols.

My new esters are definite chemical compositions, having distinct boiling and melting points. They are clearly distinguishable from the alkyd resins prepared by the random esterification of the same reactants for example, a mixture of fumaric acid, glycol, allyl alcohol and ethyl alcohol. The alkyd resins are formed by direct esterification and contain many different molecules and polymers of various sizes, while my compounds are clear liquids of uniform molecular constitution which must be polymerized through the unsaturated bonds before useful resinous materials are obtained.

The polymerization is conducted in the presence of catalysts such as hydrogen peroxide, organic peroxides such as benzoyl, acetyl and acetone peroxides, organic percarbonates such as ethyl and isopropyl percarbonates. Generally, it is necessary to activate the unsaturated esters by heating or by exposure to ultraviolet light. When completely polymerized, hard clear resins are obtained which are difficultly fusible and substantially insoluble in acetone, ether and benzene. Accordingly, it is desirable to cast them to final form or into shapes which can be readily machined to final form.

The casting is preferably done by dissolving up to three percent of catalyst in the clear liquid monomer and heating to a suitable activating temperature which will depend on the kind and quantity of catalyst present. When percarbonates are the catalysts, temperatures of 40 to 65° C. may be used. For benzoyl peroxide 65 to 90° C. temperatures are suitable. Acetone and other ketone peroxides are active at temperatures above 100° C. and in some cases as high as 160° C. The solution of the catalyst in liquid ester becomes viscous upon heating and finally gels to a clear solid which becomes harder and denser upon continued heating. Because of the shrinkage of the gel during the hardening stage uneven strains may be present and cause fractures. These may be eliminated or reduced to a minimum by using soft elastic molds which will contract with the polymer, or by lining rigid molds with elastic compositions. Generally, smooth hard materials are used to make the molds. The method is particularly adapted to the preparation of flat or slightly curved sheets.

Intermediate polymers, which, although not thermoplastic in the true sense of the word, are capable of slight forming operations, may be prepared. After forming they may be polymerized further to the infusible state. Other intermediate polymers which are truly thermoplastic may be prepared by partial polymerization and separation of monomer by precipitation, distillation or other known means of separation. The intermediate polymers may be used as molding powders and may be incorporated with fillers, pigments, dyes, other synthetic resins, or fibrous reinforcing materials.

Since the new resins are hard and thermosetting they are frequently brittle and may have lower tensile and flexural strength than many thermoplastic resins. The strengths may be substantially improved without impairing the hardness or the thermosetting properties by copolymerizing the polyunsaturated resins with a smaller proportion of a thermoplastic such as vinyl acetate, methyl methacrylate, styrene or butadiene.

The method of preparing and polymerizing the new esters will be readily apparent from the following detailed examples.

*Example I*

The acid chloride of ethyl acid fumarate (150 gms.) was added slowly to a 100 percent excess of ethylene glycol (225 gms.) at 20° C. Carbon dioxide gas was bubbled through the reaction mixture to remove the HCl. The reaction mixture was poured into 2000 cc. of water, neutralized with soda ash and separated into two liquid phases. The aqueous phase was extracted with three portions of ether 500 cc., 200 cc. and 100 cc. When the ether was evaporated a colorless oil having an index of refraction $N_{20}^d = 1.4662$ was obtained. A slight excess of pyridine (1.1 mols) was then added and the mixture cooled to 5° C. One mol of allyl chloroformate was then added dropwise at a rate slow enough to permit the maintenance of the reaction temperature between 5° C. and 10° C. The addition required about one hour during which period the mixture was stirred vigorously. After the chloroformate addition was completed the mixture was stirred for another hour. The ester was washed in 100 cc. of 2 percent HCl and twice with 100 cc. of water. The ester was then mixed with 100 cc. of ether and rewashed. After evaporation of the ether and drying over $Na_2SO_4$ the ester was heated at 100° C. at a pressure of 10 mm. to remove the low boiling fractions. The resulting product had an index of refraction $N_{20}D = 1.4623$ and a structure:

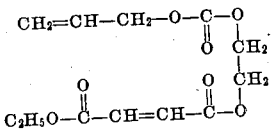

A five gram sample heated at 55° C. with .08 gm. isopropyl percarbonate was polymerized to a hard colorless solid in two hours.

*Example II*

Methyl acid fumarate was prepared by partial esterification of fumaric acid with methyl alcohol. The diester was removed by neutralizing with soda ash and extracting with water. The water solution was reacted with aqueous silver nitrate to precipitate the silver salt of methyl acid fumarate. Two hundred grams of the silver salt was suspended in water and 90 grams of ethylene iodo-hydrin was added at room temperature. The mixture was slowly heated to 60° C. and vigorously agitated for two hours. The solid silver iodide was removed by filtration. The water solution was extracted with three portions of 100 cc. ether and the ether evaporated on a steam bath. The hydroxy ester was then mixed with 500 cc. of benzene and 85 gms. (slight excess) of methallyl chloroformate and cooled to 0° C. in a reaction vessel equipped with mechanical stirring device. Caustic soda was added very slowly with vigorous stirring. The rate of addition was so controlled that the reaction temperature was maintained below 10° C. during the reaction. A bath of a salt-ice mixture was required to dissipate the heat of reaction. The resulting ester was heated close to the boiling point at 5 to 8 mm. total pressure to remove the low boiling fractions therefrom. The ester had the structure:

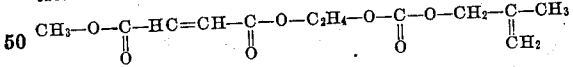

A five gram sample was polymerized to a hard clear solid by heating at 80° C. in the presence of 0.2 gm. of benzoyl peroxide.

*Example III*

The procedure of Example I was used to react diethylene glycol with the acid chloride of ethyl acid fumarate to form the half ester or hydroxy ester. The resulting half ester was then mixed with an excess of pyridine at 5° C. and a mol equivalent of allyl chloroformate was added at a rate slow enough to permit maintenance of the reaction temperature between 8° C. and 12° C. The ester had the structure:

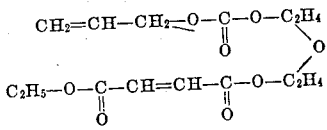

A five gm. sample was heated for about three hours at 65° C. in the presence of about two percent by weight of ethyl percarbonate. A colorless solid was thereby obtained.

Example IV

The procedure of Example I was repeated using maleic acid in place of fumaric acid. A colorless solid was produced by heating the resultant ester with 3 percent acetone peroxide for three hours at 135° C.

Although the invention is described with respect to certain specific modifications, it is not intended that the details thereof shall be limitations on the invention except to the extent incorporated in the appended claims.

What I claim is:

1. As a new compound 2-(oxycarballyloxy)-ethyl ethyl fumarate.
2. As a new compound 2-(oxycarbomethallyloxy)ethyl methyl fumarate.
3. As a new compound 2-[2-(oxycarballyloxy)-ethoxy]ethyl ethyl fumarate.
4. A polymer of the compound defined in claim 1.
5. A polymer of the compound defined in claim 2.
6. A polymer of the compound defined in claim 3.
7. An ester corresponding to the following structural formula:

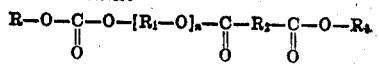

wherein R is a radical corresponding to the radical R in the alcohol ROH, said alcohol being a monohydric, unsaturated alcohol having from 3 to 9 carbon atoms and having an unsaturated carbon to carbon linkage in an aliphatic chain and between the beta and gamma carbon atoms of the alcohol, $R_1$ is an alkylene radical, $n$ is a small whole number, $R_2$ is a divalent hydrocarbon radical corresponding to the radical $R_2$ in the acid $HOOC-R_2-COOH$, said acid being an aliphatic dicarboxylic acid having an unsaturated carbon to carbon linkage adjacent an alpha carbon atom therein, and $R_3$ is a lower alkyl radical.

8. The compound of claim 7, in which the $R_2$ radical is $-CH=CH-$.
9. The compound of claim 7, in which the R radical is $CH_2=CH-CH_2-$.
10. A polymer of the compound defined in claim 7.

FRANKLIN STRAIN.